Oct. 17, 1939.  E. J. COOK  2,176,665
ENGRAVING APPARATUS
Filed Feb. 19, 1934  2 Sheets-Sheet 1
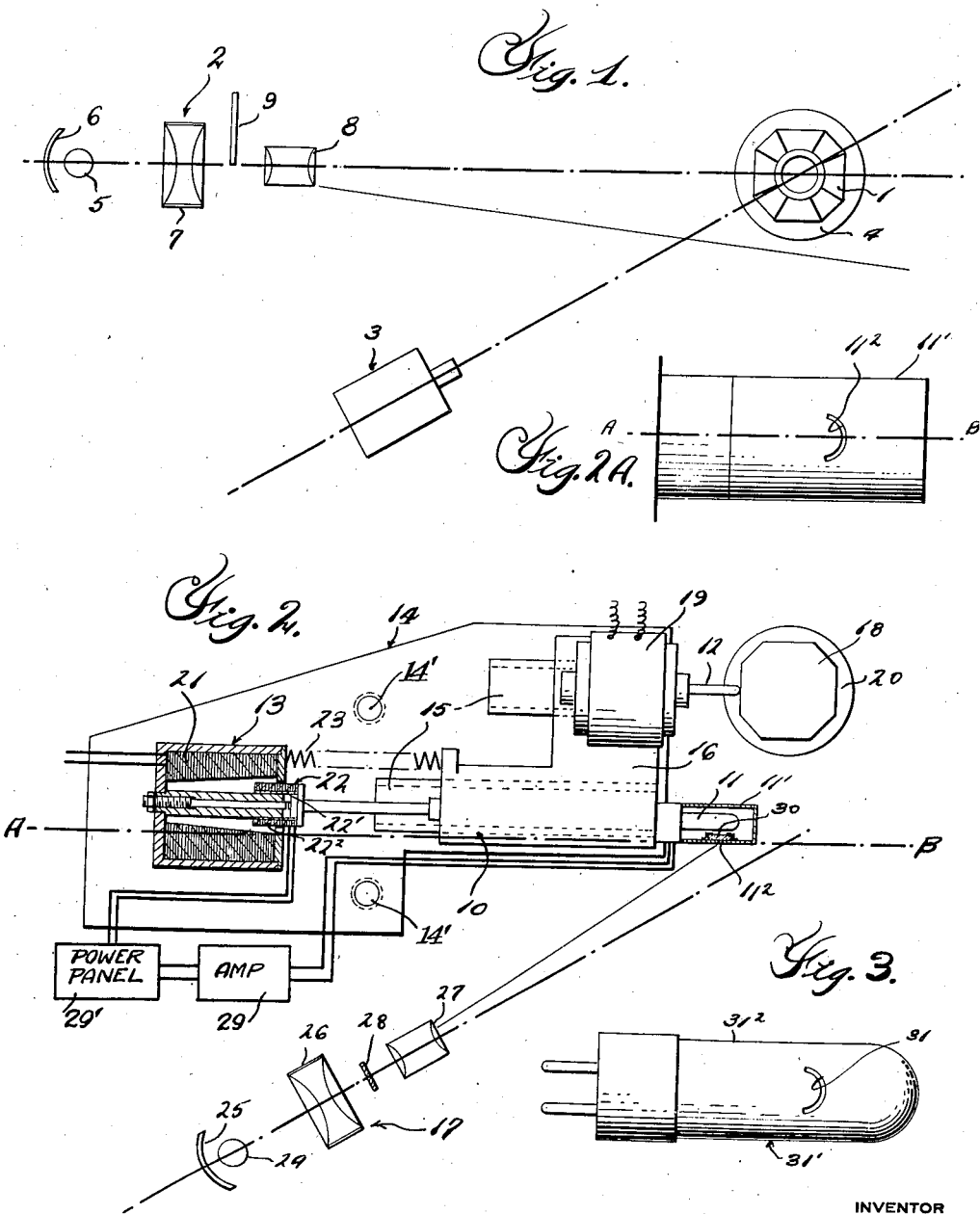
INVENTOR
Everett J. Cook

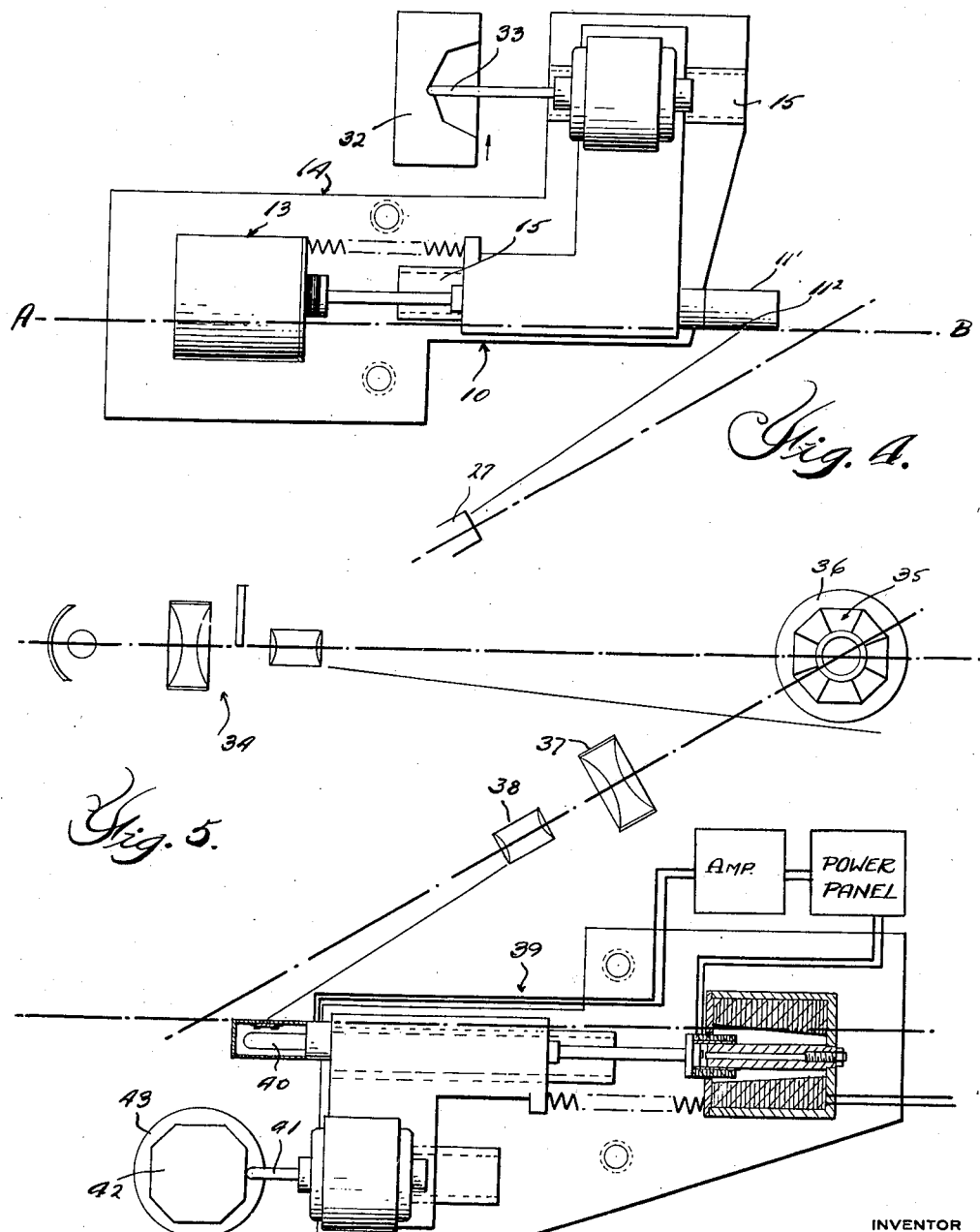

Patented Oct. 17, 1939

2,176,665

UNITED STATES PATENT OFFICE 2,176,665

ENGRAVING APPARATUS

Everett J. Cook, Toledo, Ohio, assignor, by mesne assignments, to H. H. Buggie & Company, Toledo, Ohio, a corporation of Ohio Application February 19, 1934, Serial No. 712,086

18 Claims. (Cl. 90—13.4)

The invention relates to the manufacture of reproductions of three dimensional objects, either in intaglio or cameo, and refers more particularly to the method of making the reproductions and also the apparatus. The invention has for one of its objects to provide an improved automatic control for the reproducing cutter. More particularly, the invention has for an object to control the reproducing cutter by a light sensitive cell which in turn is controlled by the image of the object and more particularly a contour line of the object, which contour line is formed by casting a shadow on the object. Another object is to control the light sensitive cell by an aerial image which may be formed by light reflected from the object or light projected through a photograph of the object.

These and other objects of the invention will become apparent from the following description, taken in connection with the accompanying drawings, in which—

Figure 1 is a diagrammatic view of an apparatus for recording the contour of the object in accordance with one of my methods;

Figure 2 is a diagrammatic view for reproducing the object from the contour line recorded by the apparatus of Figure 1;

Figure 2a is an enlarged view of a portion of the house for the light sensitive cell;

Figure 3 is a view illustrating a modification of Figure 2a;

Figure 4 is a view similar to Figure 2, illustrating a modification;

Figure 5 is a diagrammatic view of an apparatus for reproducing the object in accordance with another of my methods.

Referring to Figure 1, I is the three dimensional object to be reproduced, 2 is the projector for casting light and a shadow on the object and 3 is the apparatus for pictorially recording the shaded object. The object is preferably given a good light reflecting surface, as by painting the surface with an aluminum paint. The line of demarcation between the shadow and light is preferably vertical, as viewed along the axis or center line of the light beam cast by the projector and this line is sharply defined and forms the contour line representing the particular section of the object as viewed from the position of the recording apparatus at an angle to the axis or center line of the projected light beam. The light and shadow are caused to progress successively over the surface of the object and the contour lines are successively pictorially recorded, the object and the projector and recording apparatus being relatively movable through small increments. The degree of increment is such that the number of contour lines is sufficient to completely represent the details of the object.

In the present instance the object 1 is preferably mounted centrally upon the horizontal turn table 4 which is adapted to be successively advanced through angular increments of one degree, for example.

The projector 2 faces the object and the axis or center line of the projected light beam preferably intersects the axis of rotation of the object. This projector comprises the electric lamp 5, the reflector 6, the condenser lens 7, the objective lens 8 and the opaque mask 9 between the condenser lens and the objective lens. This mask preferably has a straight vertical edge intersecting the axis of the projected light beam.

The recording apparatus 3 is a camera which may be and preferably is of the motion picture type. This recording apparatus faces the object with its axis preferably intersecting the axis of rotation of the object and inclined to the axis of the projected light beam at an angle less than 90 degrees, this angle being determined primarily by the particular shape of the object.

With the above apparatus, the projector casts light and a shadow upon the object to form a contour line representing a section of the object as viewed from the position of the recording apparatus and the recording apparatus pictorially records the object and more particularly the contour line. The object is successively advanced and for each increment of advance a pictorial record is made by the recording apparatus.

Referring to Figure 2, 10 is the reproducing apparatus, which comprises the light sensitive cell 11, the cutter 12 and the electro-magnet 13, all mounted upon the vertically movable table 14. The cutter may be of the milling or abrasive type depending upon the character of the work. This table has the ways 15 extending parallel to the line AB and upon which the carriage 16 is movable back and forth. 17 is the pictorial record projector which may be and preferably is of the motion picture type. The projector 17 is positioned so that the axis of center line of the image projected thereby is inclined to the line AB at exactly the same angle as that shown in Figure 1 between the axis or center line of the projected light beam and the axis of the recording apparatus.

The reproducing apparatus is operable upon the work 18 to reproduce a portion or all of the object, as desired. This work is in the nature of a block of solid material and, as illustrated, is so positioned that the reproduction is in cameo.

The light sensitive cell 11 is located in the house 11' which is mounted upon one end of the carriage 16 and has the opening 11² exactly on the line AB with its axis at right angles thereto. The cutter 12 and also the electric motor 19 for driving this cutter are mounted upon the carriage at one side thereof, the cutter having its axis parallel to the line AB and at right angles to and intersecting the axis of the horizontal turn table 20 centrally carrying the work.

The electro-magnet 13 is of the dynamic type and has the stationary field 21 and the reciprocable armature 22, the field being mounted upon the table 14 and the armature being connected to the carriage 16. The field is a wire coil and the armature comprises the cylindrical member 22' and the wire coil 22² consisting of comparatively few turns of fine wire. When the electro-magnet is energized, it causes the carriage to move in a direction to move the cutter 12 outwardly with respect to the work 18.

Suitable means, which as shown in the present instance is the compression coil spring 23, normally urges the carriage 16 in the opposite direction to move the cutter 12 inwardly with respect to the work 18.

The projector 17 comprises the electric lamp 24, the reflector 25, the condenser lens 26 and the objective lens 27, the photographic record 28 of the contour line being insertable between the condenser lens and the objective lens.

The projector projects an aerial image, which has a contour defined by the contour line of the record toward the vertical plane including the line AB. The opening 11² intercepts this aerial image and while this opening intercepts the dark portion of the image, or the shadow, no electric current is built up in the circuit including the light sensitive cell 11, so that the cutter 12 is urged by the spring 23 into engagement with the work 18 to cut the same, this cutter being rotated at all times during the operation of the apparatus by its motor. However, the instant the opening 11² intercepts any part of the illuminated portion of the aerial image, or the light beam, the light sensitive cell 11 sends a signal to the amplifier 29 the output of which controls the power panel 29', the output of which latter energizes the electro-magnet 13 to move the cutter 12 in the opposite direction and to also move the opening 11² toward the dark portion of the image. This decreases the light passing through the opening to the light sensitive cell and consequently causes decrease of the power of the electro-magnet. If this latter movement continues a sufficient distance, the spring 23 reverses the direction of movement. It will thus be seen that the carriage and the cutter and light sensitive cell carried thereby are held in a position with the opening just on the edge of the illuminated portion or light beam and that this edge corresponds to the contour line above referred to. Both the amplifier and the power panel are of conventional types.

The opening 11² for the passage of light to the cell 11 has an outer contour corresponding in shape to the axial effective cutting contour of the cutter 12. Also the dimensions of the outer contour of the opening are substantially the same within very close limits as the corresponding dimensions of the axial effective cutting contour of the cutter. To increase the sensitivity of the apparatus so that the cutter will be caused to move inwardly or outwardly with respect to the work upon very slight change in the intensity of the light passing through the aperture, the opening is made relatively narrow by making its inner contour uniformly spaced a relatively small distance from its outer contour. The opening 11², in other words, is a slot which in the present instance has a C-shaped curvature with its apex facing in the same direction as the cutter 12.

By vertically moving the table 14, the light sensitive cell scans the full length of the contour of the aerial image and controls the operation of the cutter to cut a replica in the work. The vertical movement of the table is accomplished by means of the screws 14'. The speed of this vertical movement is determined by the nature of the work.

At the end of the vertical stroke, the second photograph is substituted for the original photograph and the work is advanced through an increment equal to that through which the object was advanced for the second photograph, after which the above operations are again carried out. These cycles are continued until all of the photographs are used.

For the purpose of diffusing the light passing through the opening 11², there is the diffusing lens 30 between the opening and the light sensitive cell 11. This lens is suitably mounted upon the cell house 11'.

In the modification illustrated in Figure 3, the opening 31 for the passage of light to the light sensitive element of the light sensitive cell 31' is formed directly on the bulb 31² of this cell. This opening has the same contour and dimensions as the opening 11² and is preferably formed by coating all of the outer surface of the bulb except that occupied by the opening with an opaque substance or paint.

In the reproduction of the object in intaglio as, for example, in the reproduction of the object in a mold, the work or mold blank 32 and the cutter 33, as shown in Figure 4, occupy positions the reverse of those shown in Figure 2. In these positions the cutter 33 faces in a direction exactly opposite to the cutter 12. Also either the photographs are reversed or the light sensitive cell circuit is reversed. It is also to be understood that the work or mold blank 32 has an undersized mold cavity providing for the removal of approximately the same amount of material by the cutter throughout. As shown in this illustration, the work or mold blank is successively moved laterally or transversely of the cutter in the direction of the arrow and at the ends of the vertical strokes.

With this method, it will be seen that the reproductions, either in intaglio or cameo, can be made larger or smaller than their objects by manipulation of the projector lens used for the aerial images. Also exaggerated effects may be secured by positioning the projector of the pictorial record relative to the reproducing apparatus so that the angle between the axis or center line of the projected image and the line AB is different from the angle between the axis or center line of the light beam projected by the light projector and the axis of the pictorial recording apparatus.

Figure 5 diagrammatically discloses an apparatus for making reproductions of three dimensional objects in accordance with another of my methods. In general, light and a shadow are cast on the object in the same manner as shown in Figure 1. However, instead of pictorially recording the shaded image and, more particularly, its successive contour lines and then projecting this image to control a light sensitive cell which in turn controls the cutter, aerial images created by the reflection of light from the shaded object directly control a light sensitive cell, which in turn controls the cutter.

More particularly, 34 is the projector for casting light and a shadow on the object 35. The light projector 34, the object 35 and the turn table 36 upon which the object is centrally mounted are respectively the same as the light projector 2, the object 1 and the turn table 4 shown in Figure 1. 37 and 38 are respectively the condenser and focusing lenses for directing an aerial image of the object at an angle to the axis or center line of the light beam cast by the projector 34. This aerial image is created by the reflection of the light from the image and embodies a contour line representing a particular section of the image.

39 is the reproducing apparatus which is formed in the same manner as the reproducing apparatus shown in Figure 2. The light sensitive cell 40 and the cutter 41 are movable through paths parallel to the axis or center line of the light beam cast by the projector 34 and, as specifically shown, the cutter faces in a direction opposite to the projector. The cutter is operable upon the work 42 which is mounted upon the table 43 like the turn table 30. The light sensitive cell is controlled by the aerial image and controls the movement of the cutter inwardly and outwardly with respect to the work exactly in the same manner as the light sensitive cell 11 of Figure 2, the reproducing apparatus 39 including the light sensitive cell 40 being carried by a table which is vertically movable in the same manner as the table 14. There are also the condenser and focusing lenses 37 and 38.

With this arrangement, the object 35 and the work 42 are successively advanced through small increments and the full lengths of the contour lines of the aerial images are successively scanned and reproduced. It is also to be noted that by reversing the positions of the work and the cutter and by also reversing the light sensitive cell circuit, the apparatus will reproduce the object in intaglio.

While the object and the work are shown as mounted upon turn tables, it is apparent that for certain types of objects the object should be successively moved laterally or transversely of the light beam cast by the projector 34, in which event the work should be correspondingly moved.

What I claim as my invention is:

1. The art of making a reproduction of a three dimensional object, which comprises casting a shadow on the object to produce a contour line, making a photograph of the shaded object, controlling the operation of a light sensitive cell in accordance with the photograph, and controlling the operation of a cutter by the light sensitive cell.

2. The art of making a reproduction of a three dimensional object, which comprises casting a shadow on the object, causing the shadow to progress successively over the surface of the object, making a series of photographs of the shaded object, thereby obtaining a series of contour lines representing successive sections of the object, controlling the operation of a light sensitive cell successively in accordance with the photographs, controlling the operation of a cutter by the light sensitive cell, and causing the cutter to progress successively over the surface of the work.

3. In apparatus for making a reproduction of a three dimensional object, a cutter operable upon the work, a light sensitive cell controlled by an aerial image of the contour line of the object to be produced and controlling the operation of said cutter, a house for said cell having an opening for the passage of light to said cell, the opening having an outer contour corresponding to the effective cutting contour of said cutter, and means between the opening and said cell for diffusing the light passing through the opening.

4. In apparatus for making a reproduction of a three dimensional object, a cutter operable upon the work, a light sensitive cell controlled by an aerial image of the contour line of the object to be produced and controlling the operation of said cutter, and means forming a passageway for light to the light sensitive element of said cell, said passageway having an outer contour corresponding to the effective cutting contour of said cutter and an inner contour spaced from the outer contour a relatively small distance.

5. In apparatus for making a reproduction of a three dimensional object, a cutter operable upon the work, a light sensitive cell controlled by an aerial image of the contour line of the object to be produced and controlling the operation of said cutter, and a house for said cell having an opening for the passage of light to said cell, the opening having an outer contour corresponding to the effective cutting contour of said cutter and an inner contour spaced from the outer contour a relatively small distance.

6. In apparatus for making a reproduction of a three dimensional object, a cutter operable upon the work, a light sensitive cell controlled by an aerial image of the contour line of the object to be produced and controlling the operation of said cutter, and opaque means upon the bulb of said cell forming a passageway for light to the light sensitive element of said cell, said passageway having an outer contour corresponding to the effective cutting contour of said cutter and an inner contour spaced from the outer contour a relatively small distance.

7. An apparatus for making a reproduction of a surface of an object, supporting means for a work blank and for an object having a surface to be reproduced in the work blank, means for casting a beam of light on the surface of the object to produce an image on said surface with a contour line representing one section of the surface, means for relatively moving the object and light projecting means to provide for traversing the surface of the object with the image and thereby effect a change in shape of the contour line in accordance with the shape of the surface of the object traversed, a light sensitive cell device controlled by the reflection of light from the object and shielded by a plate having an aperture therethrough intersecting the contour line of the reflected image, means controlled by the light sensitive cell to move the latter in directions to maintain the aperture in intersecting relation with the contour line, and a tool supported opposite the work blank and movable toward and away from said work blank in accordance with the movement of said light sensitive cell device.

8. An apparatus for making a reproduction of a surface of an object, suporting means for a work blank and for an object having a surface to be reproduced in the work blank, means for casting a beam of light on the surface of the object to produce an image on said surface with light and dark portions forming a sharply defined contour line on the surfaces representing one section of said surface, a light sensitive cell device having an aperture intersecting the contour line and controlled by the light passing through the aperture, means for relatively moving the light projecting means and object to cause the surface of the object to be traversed by the image, means controlled by the light sensitive cell for moving the cell in opposite directions to maintain the aperture in intersecting relation with the contour line throughout said traversing movement, and a tool supported opposite the work blank and movable by the last named means toward and away from the work.

9. An apparatus for making a reproduction of a surface of an object in a work blank, supporting means for a work blank and for an object having a surface to be reproduced in the work blank, means for casting a beam of light on the surface of the object to produce an image on said surface with a sharply defined contour line representing one section of said surface, means for relatively moving the object and projecting means to cause the surface of the object to be traversed by the contour line, a tool carriage having a tool located opposite the work blank and movable toward and away from said work blank, a light sensitive cell controlled by the reflection of light from the object and mounted on the carriage, a plate shielding the light sensitive cell from the reflected light and having an aperture intersecting the contour line of the reflected image, and means controlled by the light sensitive cell for moving the carriage toward and away from the work to maintain the aperture in intersecting relation with the contour line of the image throughout the traversing movement aforesaid and to also effect a corresponding movement of the tool relative to the work.

10. An apparatus for making a reproduction of a surface of an object in a work blank, supporting means for a work blank and an object having a surface to be reproduced in the work blank, a light sensitive cell having an aperture adapted to straddle a succession of contour lines of illuminated images representing different sections of an object and controlled by the light passing through the aperture, means controlled by the light sensitive cell for moving the same in directions to maintain the aperture in intersecting relationship with the contour lines, and a tool supported opposite the work blank and movable relative to the latter by the last named means.

11. An apparatus for making a reproduction of a surface of an object in a work blank, supporting means for a work blank and for an object having a surface to be reproduced in the work blank, a tool carriage having a tool located opposite the work blank and movable toward and away from said work blank, a light sensitive cell mounted on the carriage for movement therewith as a unit and having an aperture adapted to straddle a succession of contour lines of illuminated images representing different sections of an object, said light sensitive cell controlled by the light passing through the aperture from the images, and means controlled by the light sensitive cell for moving said carriage to maintain the aperture in straddling relationship with the contour lines and to effect a corresponding movement of the tool relative to the work blank.

12. In apparatus for making a reproduction of a surface of an object, supporting means for a work blank and an object, means for casting a beam of light on a surface of the object to produce an image on said surface having light and dark portions forming a contour line on the surface representing one section of the surface, means for relatively moving the object and light projecting means to provide for traversing the surface of the object with the image and thereby effect a change in shape of the contour line in accordance with the shape of the surface of the object traversed, a light sensitive cell having an aperture intersecting the contour line and controlled by light passing through the aperture, means controlled by the light sensitive cell to relatively move the cell and object in directions to maintain the aperture in straddling relation with the contour line, a tool supported opposite the work blank, and means for relatively moving the tool and work blank toward and away from each other in accordance with the movement of the light sensitive cell.

13. The art of making a reproduction of a three dimensional object, which comprises producing on the surface of the object a series of images having light and dark portions forming a contour line on the surface of the object representing a section of said surface, projecting successive images of the respective contour lines through an aperture in front of a light sensitive cell in a manner that the light and shadow of the images control the operation of the light sensitive cell, effecting relative movement of the light sensitive cell and images of the contour lines in accordance with the operation of the cell to maintain the aperture in intersecting relationship with the contour lines, and effecting relative movement of a cutting tool and a work blank in accordance with the movement of the light sensitive cell.

14. The art of making a reproduction of a three dimensional object which comprises casting a shadow on the object, causing the shadow to progress successively over the surface of the object, making a series of photographs of the shaded object to thereby obtain a series of contour lines representing successive sections of the object, successively projecting the pictorially recorded contour lines through an aperture in front of the light sensitive cell in a manner to control the operation of the cell by the intensity of the light escaping through the aperture, effecting movement of the light sensitive cell in accordance with the operation thereof by the intensity of light escaping through the aperture to maintain the aperture in straddling relation with the contour lines, and effecting movement of a cutting tool relative to a work blank in accordance with the movement of the light sensitive cell.

15. The art of making a reproduction of a three dimensional object, which comprises casting light and shadow on the object to produce a contour line on the object representing one section of the surface contour of the object, relatively moving the object and contour line to provide for traversing the object with the contour line and thereby effect a change in the shape of the contour line in accordance with variations in the shape of the surface of the object traversed, controlling the operation of a light sensitive cell by the reflection of light from the object and in accordance with the contour line, and controlling the operation of a cutting tool by the light sensitive cell.

16. In apparatus for making a reproduction of a surface of an object, supporting means for a work blank and an object having a surface to be reproduced in the work blank, means for casting a beam of light on the surface of the object to produce an image on said surface having light and dark portions forming a contour line on the surface representing one section of the surface, means for relatively moving the object and light projecting means to provide for traversing the surface of the object with the image and thereby effect a change in the shape of the contour line in accordance with the shape of the surface of the object traversed, a light sensitive cell subjected to the intensity of light at opposite sides of the contour line and controlled thereby, a cutting tool supported opposite the work blank, and means controlled by the light sensitive cell for relatively moving the work blank and cutting tool.

17. In apparatus for making a reproduction of a surface of an object, supporting means for a work blank and an object, means for casting a beam of light on a surface of the object to produce an image on said surface having light and dark portions forming a contour line on the surface representing one section of said surface, a light sensitive cell subjected to the intensity of light at opposite sides of the contour line and controlled thereby, means controlled by the light sensitive cell for moving said cell toward and away from the object, and a cutting tool supported opposite the work and movable as a unit with said cell.

18. The art of making a reproduction of a three dimensional object which comprises casting a beam of light on one surface of the object to provide an image on the surface having light and dark portions forming a contour line on the surface representing one section of the surface, controlling the operation of a light sensitive cell by the intensity of light at opposite sides of the contour line, and correspondingly controlling the movement of a cutting tool relative to a work blank.

EVERETT J. COOK.